May 18, 1937.   A. P. FERGUESON   2,080,468
COMBINATION WHEEL AND VALVE STEM ASSEMBLY
Filed July 9, 1934   2 Sheets—Sheet 1
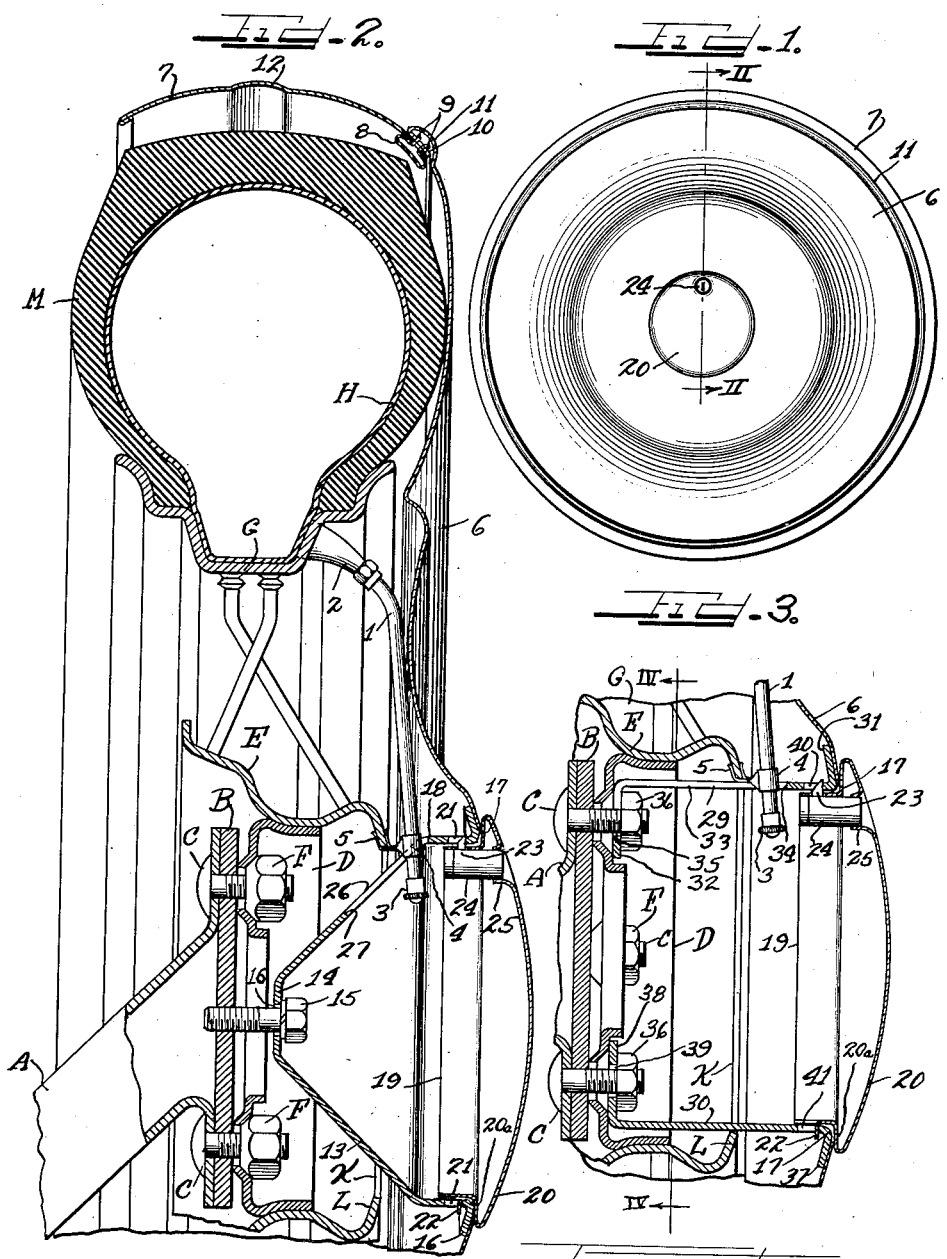
Inventor
Arthur P. Fergueson.

May 18, 1937.　　A. P. FERGUESON　　2,080,468
COMBINATION WHEEL AND VALVE STEM ASSEMBLY
Filed July 9, 1934　　2 Sheets-Sheet 2
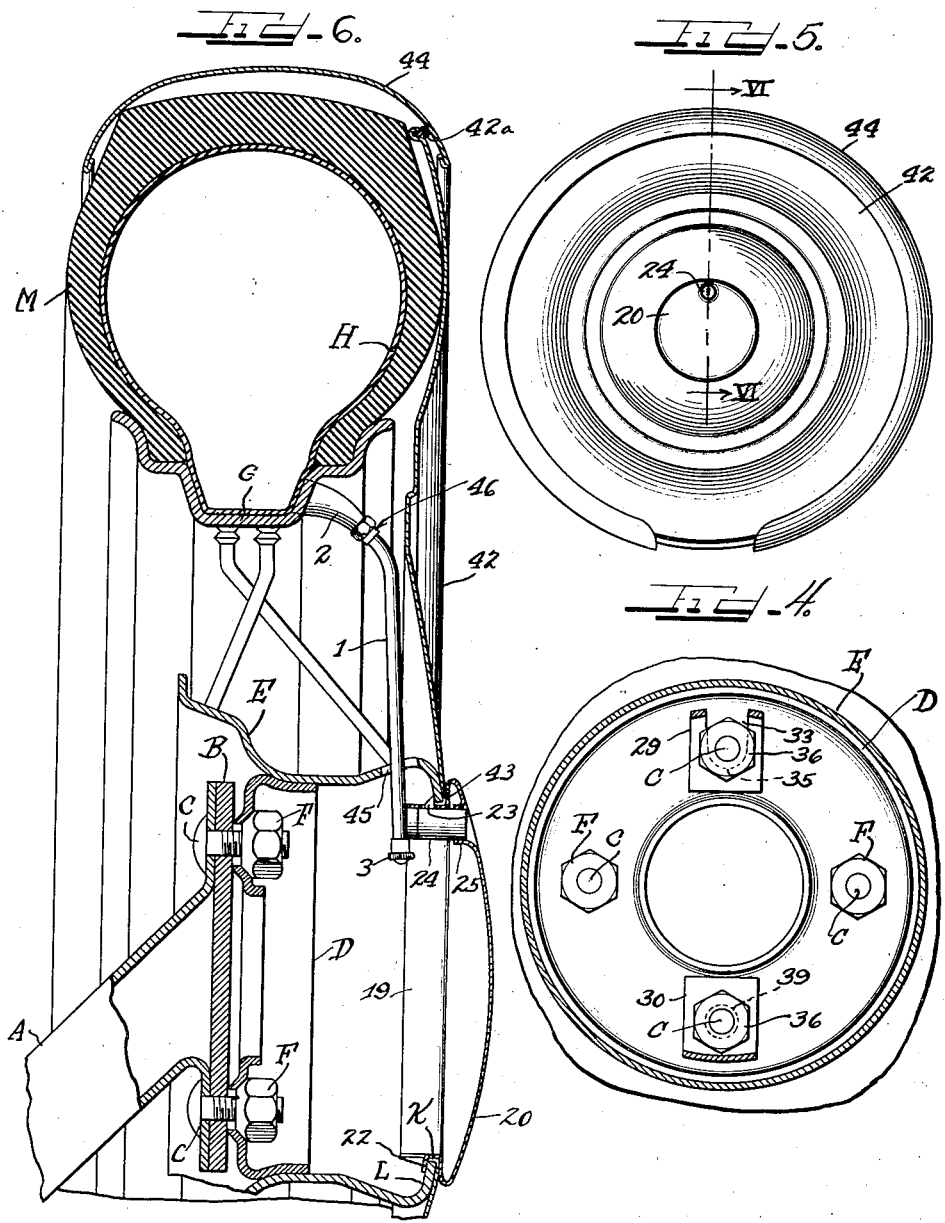
Inventor
Arthur P. Fergueson.

Patented May 18, 1937

2,080,468

UNITED STATES PATENT OFFICE 2,080,468

COMBINATION WHEEL AND VALVE STEM ASSEMBLY

Arthur P. Fergueson, Detroit, Mich., assignor to Lyon Cover Company, Detroit, Mich., a corporation of Michigan Application July 9, 1934, Serial No. 734,248

13 Claims. (Cl. 150—54)

This invention relates to a spare wheel and tire and cover and more particularly to a combination wheel, cover and valve stem assembly.

An object of this invention is to provide a wheel construction wherein the valve stem has its free end normally covered or enclosed.

It is a further object of the invention to provide a wheel and valve stem assembly of such construction that the tire and wheel cover may be imperforate, access to the stem being afforded by removal of the wheel hub cap.

Another object of this invention is to provide a novel spare wheel and tire cover assembly wherein the cover aids in the enclosure of the valve stem.

Still another object of this invention resides in the provision of a wheel, cover and hub cap construction wherein the hub cap is utilized to normally cover the free end of the valve stem and is movable to afford authorized access thereto without necessitating removal of the cover.

A further object of the invention resides in the provision of an improved spare wheel and tire cover construction.

In accordance with the general features of this invention there is provided a wheel assembly including a hollow central hub and a hub cap disposed over the opening in the hub for covering the end of a valve stem extension which extends inwardly from the rim of the tire toward the center of the wheel.

In one form of the invention the end of the valve stem is enclosed by a portion of the tire cover normally covered by a hub cap whereas in the other form of the invention the end of the valve stem is enclosed by the wheel hub itself together with the hub cap which is detachably disposed therein.

Another feature of the invention relates to the provision of locking means associated with a cover for preventing unauthorized access to the free end of the valve stem normally enclosed in the wheel assembly.

Other objects and advantages of the invention will appear as the description proceeds.

The invention (in preferred forms) is illustrated in the drawings and hereinafter more fully described.

Figure 1 is an elevational view of one form of tire cover construction and associated hub cap and lock.

Figure 2 is an enlarged fragmentary sectional view taken substantially in the plane designated by the line II—II in Figure 1, certain parts being shown for convenience in elevation.

Figure 3 is a view similar to the lower part of Figure 2 but showing a modified form of the invention.

Figure 4 is a fragmentary sectional view taken substantially in the plane designated by the line IV—IV in Figure 3.

Figure 5 is a view similar to Figure 1 but of a modified form of the invention.

Figure 6 is an enlarged fragmentary sectional view taken substantially in the plane designated by the line VI—VI in Figure 5, certain parts being shown for convenience in elevation.

Referring now more particularly to the drawings, one form of the invention is shown in detail in Figure 2, wherein a spare wheel carrier A which is preferably permanently secured to the frame of the automobile at either side or either end thereof has preferably permanently secured thereto a reinforcing flange plate B, which may be held in place by welding, riveting or the like. A plurality of attaching studs C are preferably permanently secured to the carrier A and extend forwardly in an arrangement such as to be projectable through the corresponding openings in the attaching collar D of a spare wheel hub E, and receive the attaching nuts F whereby to securely mount the spare wheel G on the carrier.

The wheel G is formed with a valve stem opening from which the valve stem I of the inner tube H extends. The connection 2 between the tube H and the stem I may be of rubber or other suitable material. The stem I adjacent the rim of the wheel G is bent so as to extend substantially radially inwardly and terminate radially inwardly of the opening K in the front wall L of the hub E. The stem I may be provided with a valve cap 3 at its free end and carries a collar 4 which is slidably mounted thereon and provides a forked spring clip 5 which opens outwardly and is arranged to be moved along the stem I so as to receive the front wall L of the hub E snugly and thus hold the stem I in substantially fixed relation to the hub E and prevent rattling.

The spare wheel and tire cover construction may be of any suitable character and is here disclosed as comprising a side plate or disc 6 shaped to generally conform to the front of the spare wheel and tire, and an endless tread covering part 7 arranged to extend substantially entirely across the tread of the spare tire M. The parts 6 and 7 may be suitably secured at their juncture adjacent the front edge of the tread as by clip buttons 8 having spring arms 9 passing through registering openings in the parts 6 and 7 and engaging the front face of the inturned margin 10 of the part 6. The part 6 is formed with a bead 11 adjacent its outer periphery and beyond the bead is returned rearwardly at the margin 10. Thus the bead 11 serves not only as an ornamental and reinforcing element but also conceals and protects the connections between the parts 6 and 7. The part 7 may also be provided with a bead 12.

To the end that the cover structure may be locked against unauthorized disturbance in proper covering relation to the spare wheel and tire, the cover structure is provided with an attaching member which, as shown in Figure 2, may take the form substantially of a cone as at 13. The apex of the cone is flattened at 14 and provided with an opening 16 through which the bolt 15 may extend and be threaded into the plate B associated with the carrier A. The member 13 is shaped to pass readily rearwardly through the hub opening K, and is provided forwardly with an outwardly extending flange 16 which may be welded, riveted or otherwise suitably secured to the front cover part 6 adjacent its substantially centrally arranged opening 17 so that the member 13 will be coaxially arranged with respect to the cover part 6.

The attaching member 13 is formed substantially cylindrically at its outer portion 18 adjacent its flange 16 so as to receive the substantially cylindrical skirt 19 of the central cap or closure 20 for the central opening in the cover part 6. The portion 18 is provided with preferably diametrically opposed openings 21 adjacent the flange 16. One of the openings is arranged to receive the outwardly struck tongue 22 projecting from the skirt 19, and the other opening is arranged to receive the keeper or plunger 23 of a preferably key-operated lock mechanism 24 fixedly carried by the depressed portion 25 of the cap 20 as by welding or the like. The plunger 23 is preferably spring pressed and bevelled on its rear face so as to be cammed inwardly readily as the same is forced against a relatively stationary object such as the inner peripheral portion of the flange 16 of the member 13. The plunger may be tumbler or otherwise operated, and the skirt 19 is provided with an opening for permitting the plunger to extend therethrough.

The tongue 22 cooperates with the generally radially outwardly extending flange portion 20a of the cap 20 to hook over the front part of the member 13 so that the tongue 22 will fit in the associated opening 21, and when the plunger 23 is released from the opposite opening 21, the cap 20 has a hinge relationship with the member 13 and may be readily swung relative thereto. The tongue 22 is formed to be readily detached from the member 13 in the event access is desired to the bolt 15 with a view either to removing the same or attaching the same. Once the cap 20 is locked relative to the member 13 as shown in Figure 2, access to the bolt 15 is prevented and therefore the wheel and cover are locked by the same instrumentality from unauthorized removal from the carrier A.

The bolt 15 may be tightened sufficiently to bring the cover part 6 in engagement with the front side of the tire as clearly seen in Figure 2.

The member 13 is provided with an opening 26 of sufficient width to accommodate the collar 4 and if desired also the cap 3, and of sufficient length to clear the collar 4 forwardly when the collar is attached at 5 to the hub E, and to clear at 27 the inner extremity of the valve cap 3. The cover part is substantially imperforate or otherwise formed so as to prevent access therethru to the valve so that when the cap 20 is locked to the member 13 thereby also locking the cover part 6, the cover and cap cooperate with the vehicle body to prevent unauthorized access to the tire valve so that there can be no mischievous tampering therewith.

In assembling the parts, the stem 1 is first connected to the hub E by means of the collar 4 and clip 5, and then the cover structure is shoved axially onto the tire, the slot or opening 26 being arranged so as to receive the extremity of the valve stem as the cover is shoved into position. The bolt 15 is then passed through the central opening in the member 13 and fitted into the threaded opening in the plate B and threaded tightly thereinto so as to bring the front cover part 6 against the tire M. The cap 20 is then hooked by means of its tongue 22 into proper cooperative relation with the member 13 and then swung rearwardly so as to cause its plunger 23 to interlock with the part 13.

In accordance with the form of the invention appearing in Figure 3, the cone member 13 is replaced by a pair of straps 29 and 30. The straps 29 and 30 are of substantially Z-shape with one arm 31 of the strap 29 disposed similarly to the flange 16 of Figure 2, adjacent the periphery of the substantially central opening 17 in the cover part 6 and welded, riveted or otherwise suitably secured to said part. The other and oppositely directed arm 32 of the strap 29 is arranged to engage over one of the hub attaching openings in the collar D. The strap 29 is provided with a longitudinal slot 33 arranged, when the cover is in proper position as shown, so that its forward terminal 34 will clear the collar 4 on the stem 1 and its opposite terminal 35, located in the arm 32, will clear the inner periphery of the stem cap 3 as the cover is shoved into and removed from its proper cooperative relation with the tire M. The terminal 35 of the slot 33 is arranged to clear the stud C, and the arm 32 is formed to be engaged on its forward surface by an attaching nut 36. In this form of the invention, the collar 4 and spring clip 5 cooperate with the stem 1 and hub E in the same way as in Figure 2.

The other strap 30 is formed like the strap 29, including its forward outer arm 37 which may be spot-welded, riveted or otherwise suitably secured to the front cover part 6, and its rear and inwardly extending arm 38 provided with an opening 39 for receiving the stud C. An attaching nut 36 is likewise applied to the stud passing through the arm 38 so as to engage said arm.

When the nuts 36 are tightened in place, the cover structure is firmly held in proper cooperative relation to the spare wheel and tire. It will be noted that a tire of greater width than that shown in Figure 3 when employed with the structure of Figure 3, would serve to space the arms 32 and 38 from the attaching collar D of the hub E, so that when the nuts 36 under such circumstances are tightened, the front cover part 6 is held against the tire M. Where the width of the tire is less than that shown, the front cover part 6 would be free of the tire M but would still be firmly held in place by the nuts 36 so as not to rattle.

The cap 20 and associated structure are identical in Figures 2 and 3 and accordingly any description of the structure including the cap 20 in Figure 3 would involve a mere duplication of that given above.

With the structure of Figures 3 and 4, therefore, it is clear that when the cap 20 is locked in place, access to the wheel mounting nuts F, strap attaching nuts 36 and the inner extremity of the stem 1 by an unauthorized person is prevented. The strap 29 is provided with an opening 40 to receive the keeper 23 and the strap 30 is provided with an opening 41 to receive the tongue 22.

It is to be appreciated that the clip 5 may be arranged to engage the member 13 or strap member 29, if desired.

The valve stem or extension 1 may be of any suitable material such as rubber or metal.

In view of the employment of similar hub cap structure in both forms of the invention already described, it will be evident that Figure 1 shows how each of the constructions appears in front elevation.

The parts are so dimensioned that when the cap 20 is locked in place, it is snugly engaged with the front of the cover structure so as to conceal the opening 17 therein and the tongue 22 and keeper 23 are likewise snugly engaged with the forward walls of the openings 21 in Figure 2 and 40 and 41 in Figure 3 so as not to rattle when locked in place.

In the form of the invention appearing in Figures 5 and 6, a somewhat modified construction is provided. While the cover may be of the same construction as that previously described, yet, for the purpose of illustration, a modified cover structure is shown. This structure comprises a front plate 42 having a substantially central opening 43 arranged to be located adjacent the front opening K in the hub E, and is constructed so that its outer periphery terminates adjacent the tread of the tire M. Another cover part is in the form of a resilient split ring 44 which is shaped to cover the tread of the tire and to extend inwardly on opposite sides thereof, one of the extensions overlapping the outer peripheral portion of the cover member 42 so as to hold the same in place on the tire.

The wheel hub E is formed with an opening 45 through which the free end of the stem or extension 1 passes as shown in Figure 6. The stem 1 is connected to the connecting member 2 at 46 and after said stem is fitted into the opening 45 it is tightly connected to the part 2. The free end of the stem 1 thus projects into the interior of the hub E, rearwardly of the front wall L.

To the end that the stem 1 may be held from rattling and may be protected against unauthorized access, the invention involves the provision of a cap 20 arranged to cooperate with the front wall L of the hub E in the same way in which the cap 20 of the previously described forms of the invention cooperates respectively with the member 13 and with the arms 29 and 30. The tongue 22 is thus formed to be detachably hooked over the inner peripheral portion of the wall L of the hub, and the lock mechanism keeper 23 is arranged to be cammed inwardly as the cap 20 is swung into locking position, and to thereafter snap or be moved outwardly into engagement with the inner surface of the wall L. The cap 20 is therefore capable of being positioned in interlocking engagement with the front wall L of the hub E in any angular relation thereto. The stem 1 is arranged to be located in the path of rearward movement of the skirt 19 of the cap 20 as the cap 20 is swung rearwardly into interlocked relation with the hub E, so that when the parts are interlocked as shown, the stem 1 at its inner portion is positioned slightly rearwardly of its normal position, having been so located by the skirt of the cap 20. Consequently the inner part of the stem 1 resiliently engages said skirt and is likewise engageable with the lock structure 24 in the event the cap happens to be located so that the structure 24 is aligned with the inner end of the stem 1. The cap 20 is preferably snugly engaged with the hub E and front cover part 42 so as not to rattle when locked thereto. The cap is formed to cover the central opening 43 in the cover part 42 when locked in position.

The collar D may be so associated with the hub E that there is preferably no stud and nut F directly behind the free end of the stem 1, so that the latter will not interfere with the application of a socket or other wrench to the nuts F.

In the form of Figures 5 and 6, if desired, the valve cap 3 may be omitted, even when the tire is on a running wheel, since the free end of the valve stem is substantially enclosed and thereby protected from foreign matter.

The invention as will be observed is extremely simple in its structural details and involves a minimum of parts which require no adjustment. In the forms shown in Figures 1 to 4, it is to be observed that the inner tube provided with the improved stem structure is applicable to wheels of different rim and hub dimensions, the collar 4 being capable of engaging with various hubs to hold the stem 1 against rattling.

If desired a cushion strip 42a may be employed between the cover members 42 and 44.

In regard to the form of the invention shown in detail in Figure 6, it will be appreciated that the stem 1 may be of such construction that, in the event its inner end were positioned in front of one of the attaching nuts F, the stem could be readily moved temporarily aside to allow the application of a wrench to the nut at the rear thereof.

If desired, a grommet may be positioned in the opening 45 or other suitable means provided to hold the stem against rattling.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a wheel assembly, a wheel having a rim with a tire thereon and a central hub, a spare tire cover for the tire and having a central opening, a valve stem projecting inwardly from the rim to a point behind said opening in the tire cover, and a hub closure cap for said opening in the cover and being supported centrally of the wheel for normally covering the free end of the valve stem.

2. In a wheel assembly, a wheel having a rim with a tire thereon and a central hub, a spare tire cover for the tire and having a central opening in alignment with the wheel hub, a valve stem projecting inwardly from the rim to a point behind said opening in the tire cover, and a hub cap extending in said opening in the cover and being supported centrally of the wheel for normally covering the free end of the valve stem, said cover having secured to it at said opening means for securing the cover to the assembly internally of the wheel hub and said means being provided with a slot through which the free end of the valve stem projects.

3. In a spare wheel assembly, a supporting member, a wheel having a central hub secured to said supporting member and having a rim with a spare tire thereon, a spare tire cover disposed over the spare tire and wheel and including a side portion with a central opening aligned with the wheel hub, said side portion having means adapted to be secured to the supporting member internally of the wheel hub, a hub cap extending through said opening in the side portion, and a valve stem projecting inwardly from the rim to a point behind said hub cap so as to require removal of the hub cap to afford access to the end of the stem.

4. In a spare wheel assembly, a supporting member, a wheel having a central hub secured to said supporting member and having a rim with a spare tire thereon, a spare tire cover disposed over the spare tire and wheel and including a side portion with a central opening aligned with the wheel hub, said side portion having means adapted to be secured to the supporting member internally of the wheel hub, a hub cap extending through said opening in the side portion, and a valve stem projecting inwardly from the rim to a point behind said hub cap so as to require removal of the hub cap to afford access to the end of the stem, said means for securing the cover to the spare wheel including a centrally disposed inwardly extending cup having a slot through which the free end of the valve stem projects to a point directly behind the hub cap.

5. In a spare wheel assembly, a supporting member, a wheel having a central hub secured to said supporting member and having a rim with a spare tire thereon, a spare tire cover disposed over the spare tire and wheel and including a side portion with a central opening aligned with the wheel hub, said side portion having means adapted to be secured to the supporting member internally of the wheel hub, a hub cap extending through said opening in the side portion, a valve stem projecting inwardly from the rim to a point behind said hub cap so as to require removal of the hub cap to afford access to the end of the stem, and means for locking the hub cap in position so as to prevent unauthorized access to the valve stem and to the means for securing the wheel to the supporting member.

6. In a wheel assembly including a wheel having a central hub member with its outer opening covered by a hub cap and a rim with a spare tire thereon, a valve stem member projecting inwardly from the rim to a point behind said hub cap so as to require removal of the hub cap to afford access to the end of the stem member, and resilient gripping means carried by one of said members and arranged to releasably grip the other of said members so as to prevent rattling between said members.

7. In a wheel assembly including a wheel having a central hub with its outer opening covered by a hub cap and a rim with a spare tire thereon, a valve stem projecting inwardly from the rim to a point behind said hub cap so as to require removal of the hub cap to afford access to the free end of the stem, and resilient gripping means carried by and adjustable along the stem and arranged to releasably grip hubs of different dimensions so as to prevent rattling between the stem and the respective hub.

8. In a wheel assembly, a wheel having a rim with a tire thereon and a central hub, a cover for the wheel and having a central opening in alignment with the wheel hub, a valve stem projecting inwardly from the rim to a point behind the opening in the cover, and a hub cap extending in said opening in the cover and supported centrally of the wheel for covering the free end of the valve stem.

9. In a wheel assembly, a wheel having a rim with a tire thereon and a central hub, a cover for the wheel and having a central opening in alignment with the wheel hub, a valve stem projecting inwardly from the rim to a point behind the opening in the cover, and a hub cap extending in said opening in the cover and supported centrally of the wheel for covering the free end of the valve stem, said cover having secured to it at said opening means for securing the cover to the assembly internally of the wheel hub, said means being provided with a slot through which the free end of the valve stem projects.

10. In a spare wheel assembly, a supporting member, a wheel having a central hub secured to the supporting member and having a rim with a spare tire thereon, a cover disposed over the wheel and including a side portion with a central opening aligned with the wheel hub, said side portion having means adapted to be secured to the spare wheel and the supporting member internally of the wheel hub, a hub cap extending through said opening in the side portion, and a valve stem projecting inwardly from the rim to a point behind said hub cap so as to require removal of the hub cap to afford access to the end of the stem.

11. In a spare wheel assembly, a supporting member, a wheel having a central hub secured to said supporting member and having a rim with a spare tire thereon, a cover disposed over the wheel and including a side portion with a central opening aligned with the wheel hub, said side portion having means adapted to be secured to the supporting member internally of the wheel hub, a hub cap extending through said opening in the side portion, a valve stem projecting inwardly from the rim to a point behind said hub cap so as to require removal of the hub cap to afford access to the end of the stem, and means for locking the hub cap in position so as to prevent unauthorized access to the valve stem and to the means for securing the wheel to the supporting member.

12. In a wheel assembly, a wheel having a rim with a tire thereon and a central hub, a cover for the wheel and having a central opening in alignment with the wheel hub, a valve stem projecting inwardly from the rim to a point behind the opening in the cover, and a hub cap extending in said opening in the cover and supported centrally of the wheel for covering the free end of the valve stem, said cover having secured to it at said opening means for securing the cover to the assembly internally of the wheel hub.

13. In a wheel assembly, a wheel having a rim with a tire thereon and a central hub, a spare tire cover for the tire and having a central opening in alignment with the wheel hub, a valve stem projecting inwardly from the rim to a point behind said opening in the tire cover, a hub cap extending in said opening in the cover and being supported centrally of the wheel for normally covering the free end of the valve stem, and releasable theft-proof locking means for locking the cap in covering position and thereby preventing unauthorized access to the free end of the valve stem.

ARTHUR P. FERGUESON.